United States Patent [19]
Zaharoni

[11] 3,797,560
[45] Mar. 19, 1974

[54] CONTROL SYSTEM FOR ENVIRONMENTAL CONDITIONING UNITS

[76] Inventor: Isaac Zaharoni, 3109 Oakhurst Ave., Los Angeles, Calif. 90034

[22] Filed: June 21, 1972

[21] Appl. No.: 264,821

[52] U.S. Cl. ................................................ 165/26
[51] Int. Cl. ............................................ F25h 29/00
[58] Field of Search ............ 145/22, 50, 26, 27, 30, 145/14, 12

[56] References Cited
UNITED STATES PATENTS
3,677,335   7/1972   Weatherston ......................... 165/26

Primary Examiner—Charles Sukalo
Attorney, Agent, or Firm—Albin H. Gess

[57] ABSTRACT

A solid state environmental control system which approximates the temperature demand curve by sequentially activating a plurality of environmental conditioning units at a given time interval while the demand exists and sequentially deactivating said units in reverse order upon cessation of said demand or upon a temperature demand of the opposite magnitude. An up-down counter controlled by solid state logic in response to temperature demands activates and deactivates the appropriate environmental unit in conjunction with a solid state logic decoder.

18 Claims, 7 Drawing Figures

| | COUNTER | DECIMAL | UNITS |
|---|---|---|---|
| | D C B A | | |
| | 1 0 1 1 | 11 | $H_1 + H_2 + H_3 + H_4$ |
| Dn ↑ | 1 1 0 0 | 12 | $H_1 + H_2 + H_3$ |
| | 1 1 0 1 | 13 | $H_1 + H_2$ |
| | 1 1 1 0 | 14 | $H_1$ |
| COUNT | 1 1 1 1 | 15 | Null |
| | 0 0 0 0 | 0 | $C_1$ |
| | 0 0 0 1 | 1 | $C_1 + C_2$ |
| ↓ | 0 0 1 0 | 2 | $C_1 + C_2 + C_3$ |
| Up | 0 0 1 1 | 3 | $C_1 + C_2 + C_3 + C_4$ |
| | 0 1 0 0 | 4 | $C_1 + C_2 + C_3 + C_4 + C_5$ |
| | 0 1 0 1 | 5 | $C_1 + C_2 + C_3 + C_4 + C_5 + C_6$ |
| | 0 1 1 0 | 6 | $C_1 + C_2 + C_3 + C_4 + C_5 + C_6 + C_7$ |
| | 0 1 1 1 | 7 | $C_1 + C_2 + C_3 + C_4 + C_5 + C_6 + C_7 + C_8$ |

CONTROL SYSTEM FOR ENVIRONMENTAL CONDITIONING UNITS

BACKGROUND OF THE INVENTION

The present invention relates generally to control systems for environmental conditioning units, and more specifically to sequential operation of a plurality of heating or cooling units.

DESCRIPTION OF THE PRIOR ART

It is well known in the environmental conditioning art that a conditioning unit designed to continuously deliver the minimum output necessary to satisfy the load requirement at all times is most satisfactory from the comfort standpoint. However, as the load demands on the system will vary considerably with changes in weather conditions, it is desirable to provide an environmental conditioning system, the output of which can be varied to meet demand changes of either short or long duration. In general, systems of this type include variable output conditioning means comprising, for example, a variety of heating units or cooling units which can be selectively operated in accordance with the base load requirements of the dwelling or other structure being conditioned under all demand requirements.

Devices in the prior art have included many types of mechanical timing means such as timing wheels and other mechanical camming devices, to achieve a staged or sequential heating or cooling effect.

SUMMARY OF THE INVENTION

The present invention is a control system for environmental conditioning units that optimizes the capacity of the relationship between the heating and cooling units utilized and the temperature demand curve. A plurality of heating and cooling units are sequentially activated as long as a heating or cooling demand is present at a rate which is determined by a clock. Once the heating or cooling demand ceases, the heating or cooling units are deactivated sequentially in reverse order. Similarly, if a temperature demand of the reverse magnitude is received, the units are deactivated sequentially in reverse order.

The heating or cooling units are activated by solid state switches which are responsive to a solid state decoder. The decoder activates the respective units depending upon the output of a counter. The counter receives clock pulses from a solid state clock and counts up, down, resets to a null state which may be other than zero, or retains a given count. The condition of the counter is controlled by a counter control means which uses solid state NOR logic in response to a heating or cooling demand signal received from a thermostat located in the monitored area.

The counter control circuitry causes the counter to count in a first direction in response to a heating command or upon cessation of a cooling command and to count in the opposite direction in response to a cooling command or upon cessation of a heating command. The counter is automatically reset to a null state, when the system is turned off, or when a fail condition has occurred causing the first heating unit and the first cooling unit to be activated simultaneously. The counter control circuitry causes said counter to retain a given count when all the heating or cooling units are active, as indicated by the last heating or cooling unit being active and the demand still being present, or when the null state has been reached in the counter and there is no heating or cooling demand. Since the counter changes count only upon the receipt of a clock pulse, the heating or cooling units are sequentially operated at a rate defined by said clock pulses.

OBJECTS OF THE INVENTION

An object of this invention is to provide a control system for operating environmental conditioning units so as to optimize the equipment capability with the temperature demands.

Another object of the present invention is to provide a control system for environmental conditioning units that controls the electric demand by limiting the stages of the environmental conditioning units that will come on.

A further object of the invention is to provide a control system for environmental conditioning units which is efficient and economical in operation, as well as in manufacturing.

Still another object of this invention is to provide a control system for environmental conditioning units which resets all units if both heating and cooling units are operating at the same time.

Other objects, advantages, and novel features of the present invention will become apparent from the following detailed description of the invention when considered in conjunction with the accompanying drawings.

DESCRIPTION OF THE PREFERRED EMBODIMENTS

It has been found that optimization of the performance characteristics of the environmental conditioning units and the demand load of the environment can be approximated by the sequential or staged operation of a plurality of heating or cooling units at a given rate.

Figure 1:
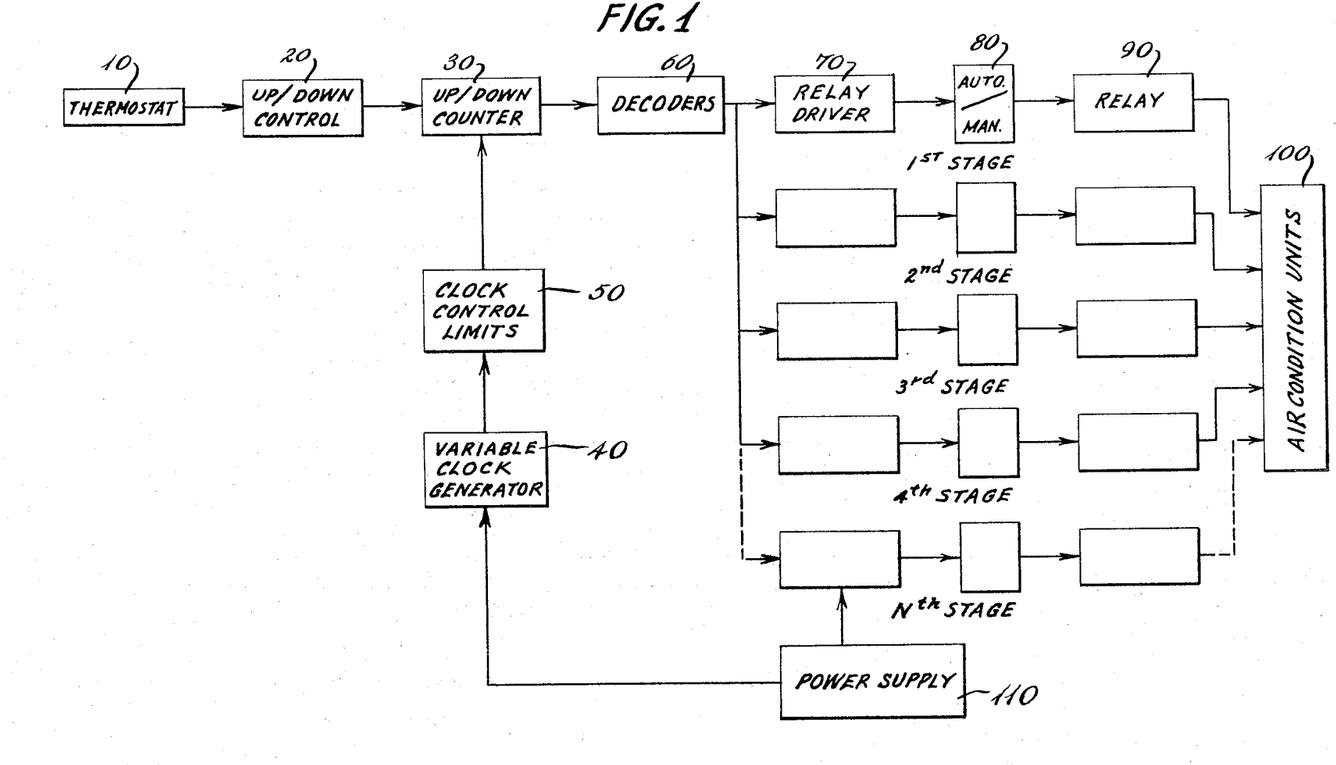
FIG. 1 is a block diagram of the solid state environmental control unit.

The preferred embodiment of the present invention, to accomplish this optimization, is depicted in FIG. 1. Thermostat 10, placed in the area to be monitored, sends heating or cooling demands or lack thereof to an up-down counter control 20. The up-down counter control 20 controls the function of up-down counter 30. Up-down counter 30 receives clock pulses from a variable clock generator 40 through a clock control limit 50. The decoder 60 interprets the count in up-down counter 30 and activates the appropriate number of heating or cooling units 100. Between the decoder 60 and the air conditioning units 100 are a plurality of relay drivers 70, automatic on-off switches 80, and relays 90. POwer supply 110 supplies the needed energy to the environmental control unit.

Briefly, the operation of the enviromental control unit is as follows: When the power is applied to the control circuit, the up-down counter 30 is automatically reset to its null state. Clock pulses are continually applied to up-down counter 30 from variable clock generator 40 and clock control limit 50. The use of these clock pulses by the counter 30 is determined by up-down counter control 20 which is responsive to temperature demands or commands from thermostat 10. For a heat command, up-down control 20 causes up-down counter 30 to count the pulses in a first direction; for a cooling demand, control 20 allows the counter 30 to count the pulses in the opposite direction. If the counter is in the null state which may be other than zero, and there is not a heating nor a cooling demand, the up-down counter prevents the counter from counting the clock pulses.

If the counter has counted in either direction in response to a temperature demand, and the demand ceases, the up-down counter control 20 reverses the counter 30 and allows the clock pulses to count the counter back to the null state. Thus upon the cessation of a temperature demand, the counter automatically reverse counts. Based on the count in up-down counter 30, decoder 60 turns on and off respective stages of heating and cooling sequentially. Since the count in the counter changes only with the clocked pulses, the period of the sequence or the time between activation or deactivation of the heating and cooling units is the same as that of the pulses to the up-down counter 30. The decoder 60 applies power to the appropriate relay driver 70 and depending upon the position of switch 80, the appropriate relay 90 is activated to apply power to the appropriate heating or cooling unit.

Switch 80, if in the automatic position, allows relay 90 to be responsive to the decoder. If switch 80 is in the off position, relay 90 is inoperative. If switch 80 is in the on position, relay 90 is continuously operative and thus its respective unit will continuously operate. This continuously on is also a convenient test position for switch 80, relay 90 and the respective unit.

As shown in FIG. 1, the number of stages are unlimited and are only restricted to what is economical for the area to be monitored or the use to which the system is to be put. Up-down counter control 20 is responsive to the operation of the individual units to determine the operation of up-down counter 30. For example, if a heating and a cooling control unit are both operative at the same time, up-down counter control 20 will immediately reset the up-down counter to its null state. Thus it alleviates an apparent failure condition by turning off all units. Up-down counter control 20 also retards or prevents the counter 30 from counting up or down additional clock pulses once the last stage or unit of a given temperature condition is operative and that temperature demand is still present from thermostat 10.

Figure 2:
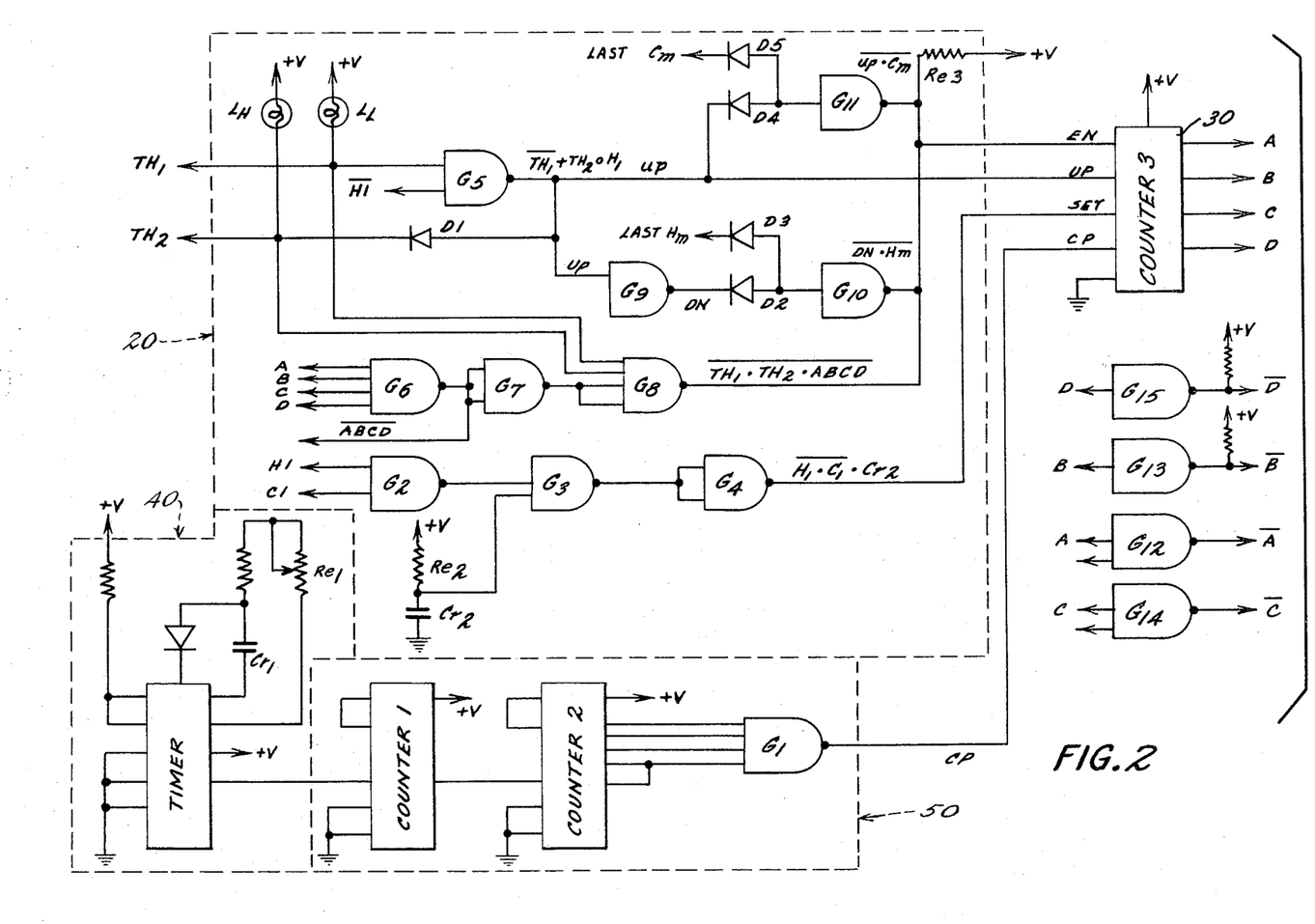
FIG. 2 is a schematic diagram of the variable clock generator, the up-down counter, and up-down counter control units of FIG. 1.

FIG. 2 depicts schematically the circuitry needed to perform the functions of up-down counter control 20, up-down counter 30, clock control limits 50 and variable clock generator 40. Variable clock generator 40 is shown as a timer with capacitor $Cr_1$ and variable resistor $Re_1$ for varying the period of said clock pulses. As an example, the pulses may appear every 3.5 seconds.

These pulses from variable clock generator 40 are accumulated in clock control limits 50 to provide an output every 900 seconds, or fifteen minutes. This is accomplished by the use of counters 1 and 2 and gate G-1. The relationship of counters 1 and 2 and gate G-1 are such that for every 256 pulses from the variable clock generator, a clock pulse CP is transmitted to counter 3 which is up-down counter 30 in FIG. 1. The period or interval of the clock pulses is but an example for specific application of the present system, but may be varied by the adjustment of $Re_1$ and by the relationship of counters 1 and 2 and gate G-1.

When the system is intially turned on, the power switch applies the V+ power to all of the terminals indicated V+ in all the Figures. With the application of power to the system, capacitor $Cr_2$ is charged through resistor $Re_2$. From the time it takes for the capacitor $Cr_2$ to charge, there is no input at one of the terminal of gate G-3. As will be seen, as long as $Cr_2$ is charging and before it has reached its final value, the input to SET terminal of counter 3 is low. This is the case because the output of gate G-2 is high in response to the states of the heating and cooling units. When the SET input of counter 3 is low, the counter is reset to its null state, which may be other than zero. Once $Cr_2$ is fully charged, an input is constantly applied to one terminal of gate 3. This high input plus the other high input from gate G-2 causes gate G-3 to generate a low which is inverted by gate G-4. Thus independent of the state of the environmental control unit, it is reset when shut-off and remains reset until turned on again.

Figure 5:
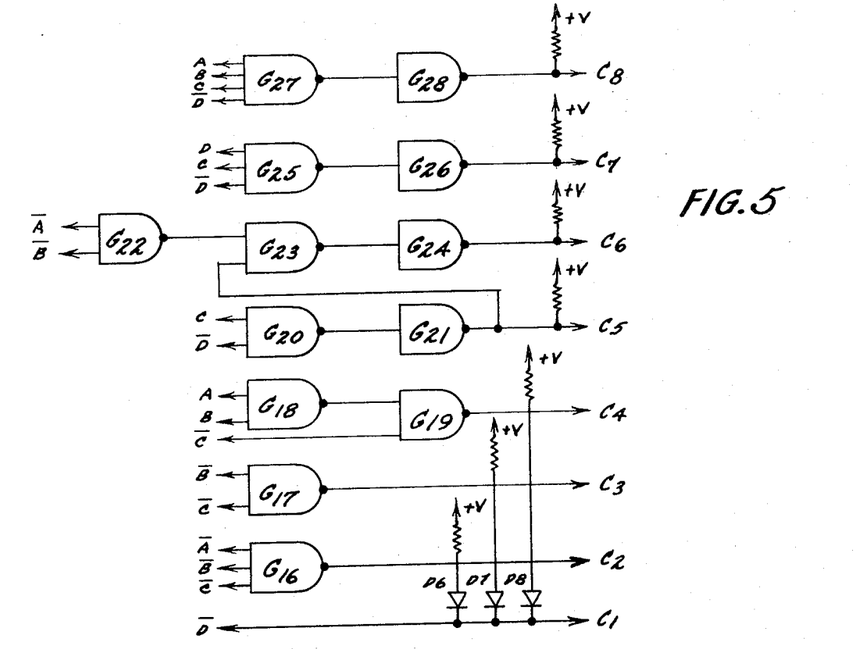
FIG. 5 is a schematic of the decoder for the cooling units.
Figure 6:
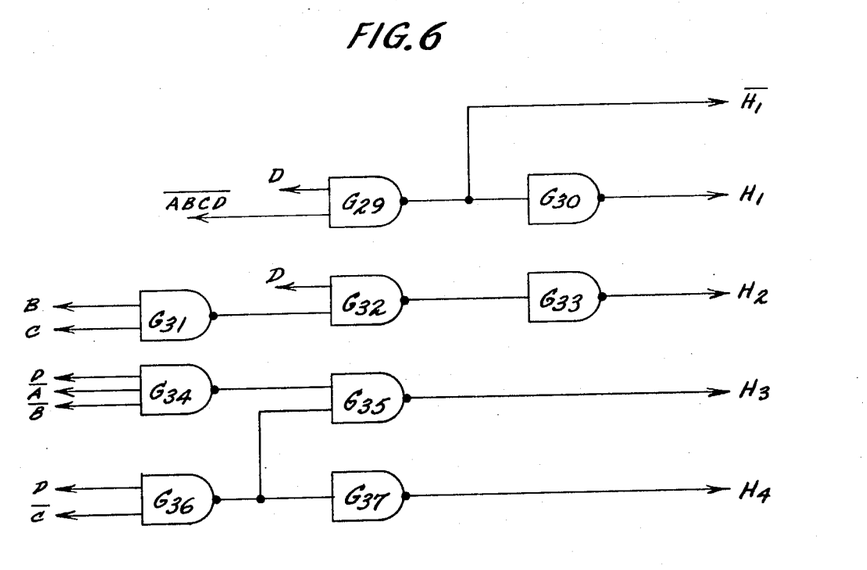
FIG. 6 is a schematic of the decoder for the heating units.

Another condition which will reset the counter to its null state is the fail-safe feature. When a first heating unit $H_1$ and a first cooling unit $C_1$ are operating at the same time, the counter is reset to its null state and thus turns off all heating and cooling units. This can be seen from the inputs to gate G-2. It should be noted that all gates disclosed in FIGS. 2, 5 and 6 are NAND gates. With both inputs to gate G-2 high, its output is low. Following the logic through gates G-2, G-3 and G-4 it can be seen that the SET terminal to counter 3 is high only if $Cr_2$ is fully charged and $H_1$ and $C_1$ are both absent or only one is present, i.e., $H_1 \cdot C_1 \cdot Cr_2$.

The major inputs to up-down counter control 20 are $TH_1$ and $TH_2$, which are connected to the cooling and heating demand circuitry of thermostat 10. When there is a cooling command, input $TH_1$ is grounded and when there is a heating command, input $TH_2$ is grounded. Thus a cooling command will be defined as $TH_1$ and a heating command will be defined as $TH_2$. When the heating or cooling command are present and thus the respective inputs are grounded, lamps LH and LC are lit, indicating the presence of a heating or cooling command, respectively.

Figure 3:
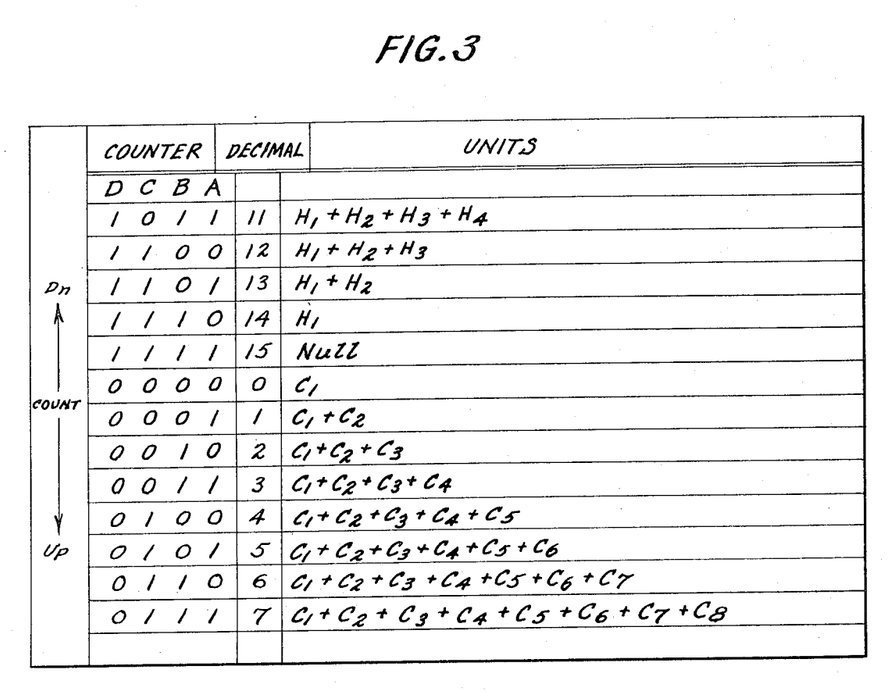
FIG. 3 is a table defining the relationship of the counter's output and the heating and cooling units.

Before describing in detail the function of up-down counter control 20, a brief look at FIG. 3 would be helpful. As a matter of design, the null condition has been defined as 1111 or all four stages of binary counter 3 in the high state. Also as a matter of design choice, a down count has bbeen defined as a heating command and an up-count has been defined as a cooling command. As can be seen from FIG. 3, as the counter counts down, more heating units are added in sequence to those already on. If heating units are activated and the counter counts up, the last unit to be turned on is the first unit to be turned off. For example, if the counter is at 1011 all four heating units are on.

As the counter counts up, heating unit four is turned off, then heating unit three, heating unit two and finally heating unit one, until the null state is reached. The same is true for the cooling units except in the reverse. For an up-count, the cooling units are turned on one at a time sequentially. As the counting increases, so do the number of units on. As the counter counts down, the cooling units are turned off one at a time with the last unit to be turned on turned off first.

To summarize, to turn on heating units or turn off cooling units, the counter counts down. To turn on cooling units and turn off heating units, the counter must count up. Also, the null state is defined as 1111. Though FIG. 3 illustrates the operation of 8 cooling units and 4 heating units, the number of units is unlimited. The use of counter 3 limits the total number of heating and cooling units to 15. But, by the use of additional binary counters, the number of units are unlimited.

Returning to FIG. 2 and a detailed description of up-down counter control 20, an up-count has been defined as that responsive to a cooling demand to turn on cooling units. Also an up-count is desired to turn off heating units after the heating demand has disappeared or ceased. To express this in logic form, up = $\overline{TH_1} + TH_2 \cdot H_1$. It should be remembered that $\overline{TH_1}$ is a cooling demand and $TH_2$ is lack of a heating demand. To achieve this equation, input $TH_2$ is connected by diode 1 to the up-line of counter 3, and $\overline{TH_1}$ and $H_1$ are combined in gate G-5 which is also connected to the up-input of counter 3. A down-count is defined as a low signal on the up-input of counter 3. It is desirable to count down when there is a heating command or when there is no cooling command and at least the first cooling unit is on. It is desirable to count up when there is a cooling command or when there is no heating command and at least the first heating unit is on.

There are three conditions when the counter should maintain its present count notwithstanding the input of clock pulses. These conditions are: when the counter is at a null state and there is no heating or cooling command, when there is a down-count and the last heating stage is on, and when there is on up count and the best cooling stage is on.

Since the up-input of counter 3 either causes an up or down count, there must be some limitation on the counter such that once a temperature demand signal has ceased, and all the units have been automatically turned off, thus reaching a null state, the counter stops counting. Otherwise the counter will automatically count through the null state and start turning on units of the other temperature magnitude without that command signal present. To achieve this, the null state, i.e., 1111 or ABCD, is determined by gate G-6, reinverted by gate G-7 and combined with the temperature command lines $TH_1$ and $TH_2$ at gate G-8. This gate's output is applied to enable terminal of counter $C_3$ and has the equation of $$\overline{TH_1 \cdot TH_2 \cdot ABCD}$$

In other words, the output of gate G-8 is high for all combinations of inputs except when there is no cool demand ($TH_1$), there is no heat demand ($TH_2$), and the counter is in the null state (ABCD) all at the same time.

Also connected to the enable input is the output of gate G-10, which is high for all conditions except when there is a down-count and the last heating stage is on or, in logic form, $\overline{DN \cdot Hm}$. This is achieved by inverting the up-signal through gate G-9, combining it through diode $D_2$ with the last heating stage applied through diode $D_3$, and applying it to gate G-10. Similarly connected to the enabling contact of counter 3 is the output of gate G-11. This output is high for all inputs except when there is an up-count and the last cooling stage is on. This is expressed as $\overline{UP \cdot Cm}$. This is achieved by combining the up-command through diode $D_4$ with the last cooling stage through diode $D_5$ at the input of gate G-11. Obviously if the last stage of the heating or cooling units are on and the command for that particular temperature is required, the counter would continue counting if not disabled and therefor upset the logic and possibly turn off the required units and on the units of the opposite magnitude.

Since it is desired to enable the counter for all conditions except the three conditions listed above, the outputs of the gates G-8, G-10 and G-11 must all be present to overcome the clamping voltage at the enable input to counter $C_3$ through resistor $Re_3$. Thus the counter is enabled to receive counting pulses and count up or down if, and only if, all three of the gate outputs are high. In other words, enable = $(\overline{TH_1 \cdot TH_2 \cdot ABCD}) \cdot (\overline{DN \cdot Hm}) \cdot (\overline{UP \cdot Cm})$.

The output of gate G-6 is a convenient place for tapping the lack of null condition or ABCD. Gates G-12, 13, 14 and 15 provide the logic symbols $\overline{A}$, $\overline{B}$, $\overline{C}$, and $\overline{D}$, respectively. It is these five outputs, as well as the four outputs i.e., A, B, C, D, of counter 30 or counter 3 which are fed to the decoder 60.

Figure 4:
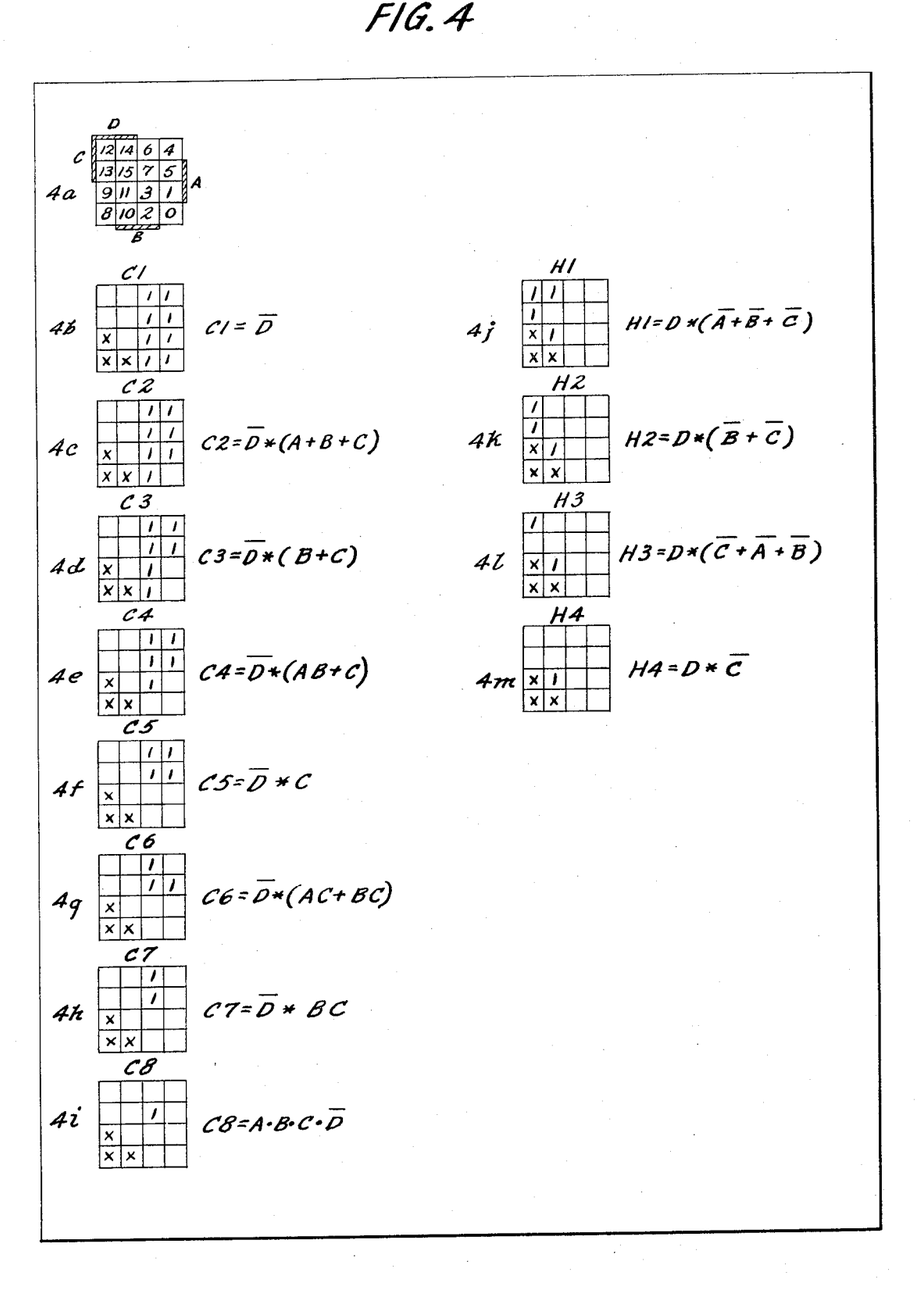
FIG. 4 is a diagram of the Karnaugh maps of the decoder logic.

Before a complete understanding of the decoder 60 can be obtained, analysis of FIGS. 3 and 4 must be mastered. As explained previously, the scheme of the present system has defined the null state as 1111 and that the cooling units are turned on by counting up therefrom and that the heating units are turned on by counting down therefrom. In FIG. 3, it can be seen that the heating and cooling units are turned on in sequence and each previous stage is held on until the last stage of the heating or cooling is reached. To look at it another way, cooling stage $C_1$ must be on when cooling stage $C_1$, $C_2$, $C_3$, $C_4$, $C_5$, $C_6$, $C_7$ and $C_8$ are on. Also $C_2$ must be on when stages $C_2$, $C_3$, $C_4$, $C_5$, $C_6$, $C_7$ and $C_8$ are on. Or as stated in the reverse, $C_8$ must be on only when it is required; that is, when the count in the counter is that of $C_8$. $C_7$ must be on for the count of $C_7$ and for the count of $C_8$, and likewise, $C_6$, $C_5$, $C_4$, $C_3$ and $C_2$ must be on for their count and each count higher up to the last unit. Again it must be stressed that the member of heating and cooling units are but examples and not limiting.

With these basic concepts in mind, one can now go to the Karnaugh maps of FIG. 4 to reduce the logic required to reproduce the truth tables displayed therein. Since the embodiment shown has four heating units and eight cooling units plus the null state, the count numbers 8, 9 and 10 will not occur. Therefore, their boxes on the Karnaugh maps are shown with X's. FIG. 4a shows the relationship between the decimal numbers and the binary coded decimal number. Starting with the simplest case of turning on unit $C_8$ alone, refer to FIG. 4i. In the present scheme, cooling unit $C_8$ is turned on whenever the count of 7 is reached in the counter. Thus a 1 is placed in the 7 box of FIG. 4i. Since all preceding cooling units must also be one, a 1 is placed in the 7 of Karnaugh maps displayed in FIGS. 4b–4i. Similarly, to turn on cooling unit $C_7$, the count of 6 must be reached. Thus the 1 is placed on the Karnaugh maps of units $C_7$ down to unit $C_1$ and so on and so forth unitl $C_1$ is reached showing that cooling unit $C_1$ must be on for all numbers from zero through seven.

The heating Karnaugh maps are drawn the same way, starting with the highest heating unit $H_4$ and its decimal number 15. The Karnaugh maps for the heating units are shown in FIGS. 4j–4m. Once the Karnaugh maps are drawn, the reduction of the logic to remove redundancies will result in the expressions shown to the right of FIGS. 4b–4m. Thus for cooling unit $C_1$ to be on, D must be absent, or $\overline{D}$. Similarly, for example, for cooling unit $C_8$ to be on, only the number 7 must be in the counter or $A.B.C.\overline{D}$. Using the equations from the Karnaugh map, the decoder is easily designed. It should be noted that the Karnaugh maps may be of any size and contain as many variables as required to design and synthesize the system for any particular application.

Referring now to FIG. 5, the decoder for the cooling stages is shown. Cooling stage $C_1$ is activated for an input of $\overline{D}$. Cooling stage $C_2$ is initiated by the inputs of $\overline{A}$, $\overline{B}$, and $\overline{C}$ to Gate G-16 to be combined with $\overline{D}$ through $D_6$ and offset by a clamp voltage to provide $C_2$. Similarly, outputs to initiate cooling unit $C_3$, $C_4$, $C_5$, $C_6$, $C_7$, $C_8$ using the equations of FIG. 4 are accomplished by the use of logic gates G-17; G-18 and G-19; G-20 and G-21; G-22, G-23, and G-24; G-25 and G-26; and G-27 and G-28, respectively as well as their respective clamping voltage.

FIG. 6 shows the solid stage logic used to turn on heating stages $H_1$, $H_2$, $H_3$ and $H_4$ using the equations of FIG. 4. $H_1$ is initiated by inputs to gates G-29 and G-30; $H_2$ by the appropriate inputs to gates G-31, G-32 and G-33; $H_3$ by the appropriate inputs to gates G-34, G-36 and G-35; and heating unit $H_4$ by the appropriate inputs to gates G-36 and G-37.

Figure 7:
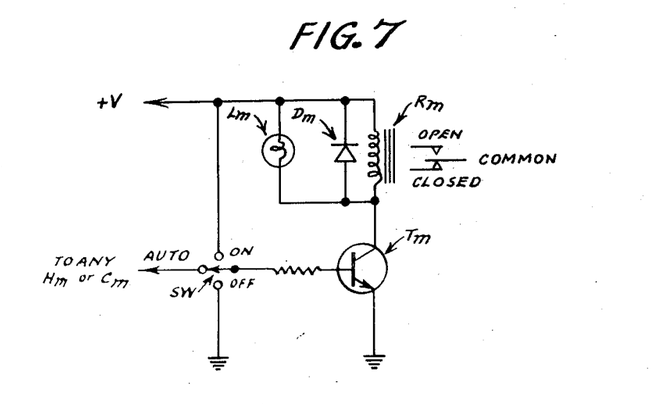
FIG. 7 is a schematic of the relay driver control, switch relay, and indicator for individual air conditioning units.

As shown in FIG. 1, the output from the decoder are fed to a plurality of relay drivers 70, switches 80 and relays 90 to initiate individual heating and cooling units 100. The outputs $C_1 - C_8$ and $H_1 - H_4$ of FIGS. 5 and 6 respectively are used to apply a voltage to these relay drivers 70. FIG. 7 is an example of the relay driver 70, control switch 80, and relay 90. Shown therein is a transistor Tm whose base is connected to a switch SW. The switch is a three-pole switch whose poles are selectively connected to terminals labelled "on," "auto," and "off." When the switch is place off, the base of the transistor is grounded and the transistor will not conduct. When the switch is placed in the one position, the transistor is connected at the base to an appropriate voltage and the transistor conducts continuously. When the switch is connected to the automatic contact, transistor Tm conducts only when a positive voltage is applied to the base. This occurs when the respective output from decoder 60 is high. When the transistor conducts, relay Rm is activated, closing a switch to apply power to the respective heating or cooling units. Across the relay Rm is diode Dm and a lamp Lm. Once the transistor Tm conducts and the relay is activated, lamp Lm is ignited to indicate that that particular heating or cooling stage is operating.

Though the input to the basic control system is shown as thermostat 10, this thermostat may be responsive or sense temperature, pressure or humidity and have an output signal that is a function of the relationship of these three variables to give a more meaningful heating or cooling command. The environmental controller with predetermined variable timing to control the sequence of operation of mechanical or electrical environmental systems is applicable to independent package units in a single zone as described herein, or may also be applied to multi-zone systems with a corresponding plurality of sensors or thermostats.

The number of heating or cooling units disclosed herein are but by way of example and are in no way limiting. The system is capalbe of expanding to any known number of units to be limited only by the economics of the design. The logic shown herein is solid state logic using NAND gates, but any appropriate logic may be used to accomplish the objects and to perform the functions described herein.

The present environmental control unit turns on sequentially a plurality of heating and cooling units to optimize the relationship between the environmental units and the temperature demand. The system provides a fail-safe feature to turn off all units if the heating and cooling units are operating at the same time, as well as the feature of resetting the control system when the unit is initially powered. By the use of solid state clocks, timers and up-down counter, as well as NAND logic, the present environmental control unit provides an efficient, economical and sophisticated system. Obviously many modifications and variations of the present invention are possible in light of the above teachings. It is therefore to be understood that within the scope o the appended claims, the invention may be practiced otherwise than as specifically described.

What is claimed:

1. A control system for operating a plurality of heating and cooling units comprising: command means for producing a heating or cooling command;
   counter means for counting up and down; counter control means responsive to said command means for controlling siad counter means to count up, count down, reset to a null state, and maintain a given count;
   pulsing means for transmitting periodic pulse to said counter means; and, air-conditioning control means for controlling said heating and cooling units in response to said counter means' output.

2. A system as in claim 1 wherein said counter control means rests said counter means to a null state when said system is turned on, or when said heating and cooling units are operating simultaneously.

3. A system as in claim 1 wherein said plurality of units are activated sequentially at a rate defined by said periodic pulses.

4. A system as in claim 3 wherein said plurality of units are deactivated sequentially.

5. A system as in claim 4 wherein said counter control means allows said counter means to count in a first direction for a heating command and in the opposite direction for a cooling command.

6. A system as in claim 5 wherein said counter control means allows said counter means to count in said first direction upon cessation of said cooling command and in said opposite direction upon cessation of said heating command.

7. A system as in claim 6 wherein said counter control means prevents further counting in response to a cessation of said command signal when said counter means reaches said null state.

8. A system as in claim 1 wherein said counter control means causes said counter means to maintain its present count when:
   there is a heating command and the last heating stage is activated; or
   there is a cooling command and the last cooling stage is activated; or
   said counter is in said null state and there is no heating or cooling command.

9. A system as in claim 1 wherein said air conditioning control means includes:
   a plurality of switching means for activating a corresponding heating or cooling unit; and
   decoder means responsive to said counter means' output to activate the appropriate switching means.

10. A system as in claim 9 wherein each of said switching means includes a selection means for causing said switching means to:
   be responsive to said decoder means; or
   be activated continuously; or
   be deactivated continuously.

11. A system as in claim 9 wherein said decoder means activates said heating units sequentially and maintains previously activated heating units activated.

12. A system as in claim 11 wherein said decoder means activates said cooling units sequentially and maintains previously activated cooling units activated.

13. A system as in claim 12 wherein said decoder means deactivates the last to be activated unit first.

14. A system as in claim 13 wherein said sequence of activation and deactivation is at a rate defined by said periodic pulses.

15. A control system for operating a plurality of heating and cooling units in a defined environment, comprising:
   means for generating a heating or a cooling command in response to environmental conditions;
   means for sequentially activating said heating units in response to the presence of a heating command if less than all said heating units are activated and all said cooling units are deactivated;
   means for sequentially deactivating said heating units in response to the absence of a heating command or the presence of a cooling command;
   means for sequentially activating said cooling units in response to the presence of a cooling command if less than all said cooling units are activated and all said heating units are deactivated;
   means for sequentially deactivating said cooling units in response to the absence of a cooling command or the presence of a heating command; and
   means for deactivating all said cooling and heating units in response to a cooling and heating unit being simultaneously active.

16. The control system of claim 15 wherein said heating units deactivating means deactivates the last activated heating unit first.

17. The control system of claim 15 wherein said cooling units deactivating means deactivates the last activated cooling unit first.

18. The control system of claim 15 further comprising means for resetting said heating and cooling units activating and deactivating means to a null state when the control system is turned off.

* * * * *